US012621601B2

(12) United States Patent
Ioku

(10) Patent No.: US 12,621,601 B2
(45) Date of Patent: May 5, 2026

(54) ELECTRONIC MUSICAL INSTRUMENT AND SOUND EMITTING UNIT

(71) Applicant: YAMAHA CORPORATION, Hamamatsu (JP)

(72) Inventor: Kenta Ioku, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 128 days.

(21) Appl. No.: 18/609,079

(22) Filed: Mar. 19, 2024

(65) Prior Publication Data

US 2024/0323597 A1 Sep. 26, 2024

(30) Foreign Application Priority Data

Mar. 22, 2023 (JP) ................................. 2023-044948

(51) Int. Cl.
*H04R 1/34* (2006.01)
*G10H 1/32* (2006.01)
*H04R 1/02* (2006.01)

(52) U.S. Cl.
CPC ............... *H04R 1/345* (2013.01); *G10H 1/32* (2013.01); *H04R 1/025* (2013.01); *G10H 2220/221* (2013.01)

(58) Field of Classification Search
CPC .......... H04R 1/345; H04R 1/025; G10H 1/32; G10H 2220/221
USPC .......................................................... 381/118
See application file for complete search history.

(56) References Cited

U.S. PATENT DOCUMENTS

| | | | | |
|---|---|---|---|---|
| 12,413,903 | B2 * | 9/2025 | Akai | G10H 1/32 |
| 2018/0182363 | A1 * | 6/2018 | Hoshino | G10H 1/32 |
| 2020/0236462 | A1 | 7/2020 | Kitagawa et al. | |
| 2022/0303672 | A1 * | 9/2022 | Ioku | H04R 1/345 |

FOREIGN PATENT DOCUMENTS

| | | | |
|---|---|---|---|
| EP | 3684077 | A1 | 7/2020 |
| JP | 2020178336 | A | 10/2020 |

* cited by examiner

*Primary Examiner* — Sean H Nguyen
(74) *Attorney, Agent, or Firm* — ROSSI, KIMMS & McDOWELL LLP

(57) ABSTRACT

An electronic musical instrument includes a sound emitting unit disposed on a back surface of a top plate. The sound emitting unit includes: a speaker driver holding portion configured to hold a speaker driver configured to emit sound toward the top plate; a diffuser including a tapered shape and disposed on the speaker driver holding portion with a distal end portion of the diffuser facing the speaker driver, the diffuser being configured to guide a sound wave emitted from the speaker driver in a direction along the back surface of the top plate; and an attachment portion configured to suspend the speaker driver holding portion and attached to the back surface of the top plate.

14 Claims, 3 Drawing Sheets

ELECTRONIC MUSICAL INSTRUMENT AND SOUND EMITTING UNIT

CROSS-REFERENCE TO RELATED APPLICATIONS

This application is based on and claims priority under 35 USC 119 from Japanese Patent Application No. 2023-044948 filed on Mar. 22, 2023, the contents of which are incorporated herein by reference.

FIELD

The present disclosure relates to an electronic musical instrument, such as a keyboard electronic musical instrument, and a sound emitting unit thereof.

BACKGROUND

A speaker such as a dynamic speaker that vibrates a diaphragm has strong directivity in a front direction. Therefore, an electronic musical instrument or the like uses a sound emitting unit in which a sound emitting control device called a diffuser is provided in front of the speaker. For example, in JP2020-178336A, a sound emitting unit including a conical diffuser with a distal end facing a diaphragm is provided on both left and right sides of a keyboard of a keyboard electronic musical instrument.

SUMMARY

In a technique disclosed in JP2020-178336A described above, since the sound emitting unit including the diffuser is provided at the height at which the keyboard of the keyboard electronic musical instrument is provided, uniform amplitude frequency characteristics may not be attained in a horizontal direction at a height of a head of a player, and the sound quality may change when the player moves the head.

The present disclosure has been made in view of the above circumstances, and an object thereof is to provide an electronic musical instrument capable of attaining uniform amplitude frequency characteristics in a horizontal direction.

The present disclosure provides an electronic musical instrument including a sound emitting unit disposed on a back surface of a top plate, in which the sound emitting unit includes: a speaker driver holding portion configured to hold a speaker driver configured to emit sound toward the top plate; a diffuser including a tapered shape and disposed on the speaker driver holding portion with a distal end portion of the diffuser facing the speaker driver, the diffuser being configured to guide a sound wave emitted from the speaker driver in a direction along the back surface of the top plate; and an attachment portion configured to suspend the speaker driver holding portion and attached to the back surface of the top plate.

BRIEF DESCRIPTION OF DRAWINGS

The present disclosure will be described in detail based on the following figures, wherein.

DETAILED DESCRIPTION

Hereinafter, an embodiment of the present disclosure will be described with reference to the drawings.

Figure 1:
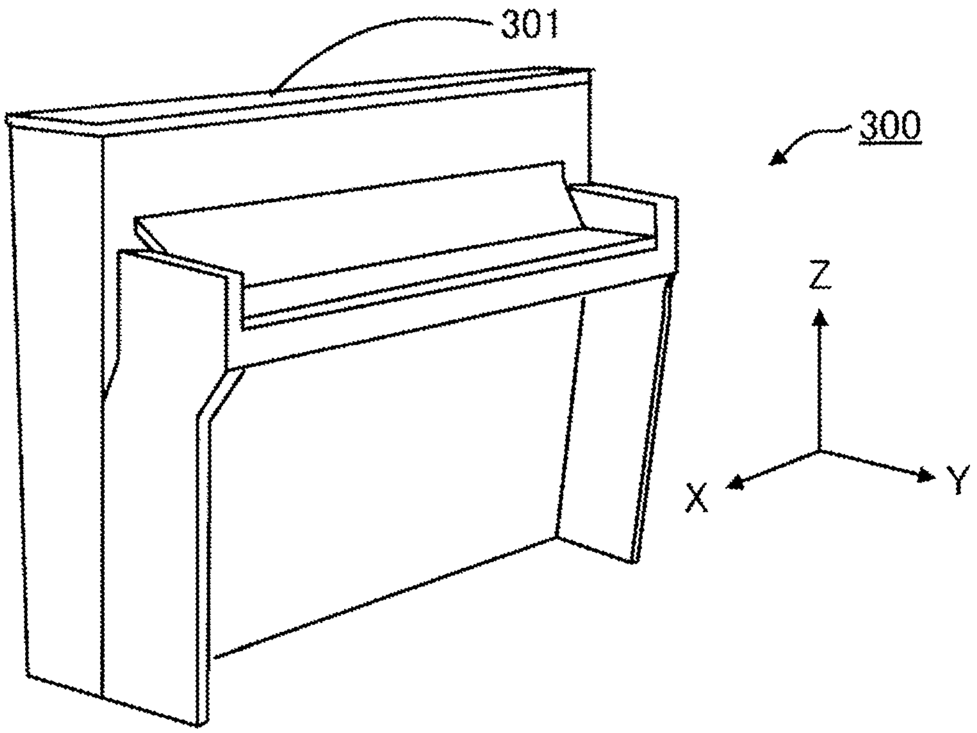
FIG. 1 is a perspective view showing a configuration of a keyboard electronic musical instrument according to an embodiment of the present disclosure.
Figure 2:
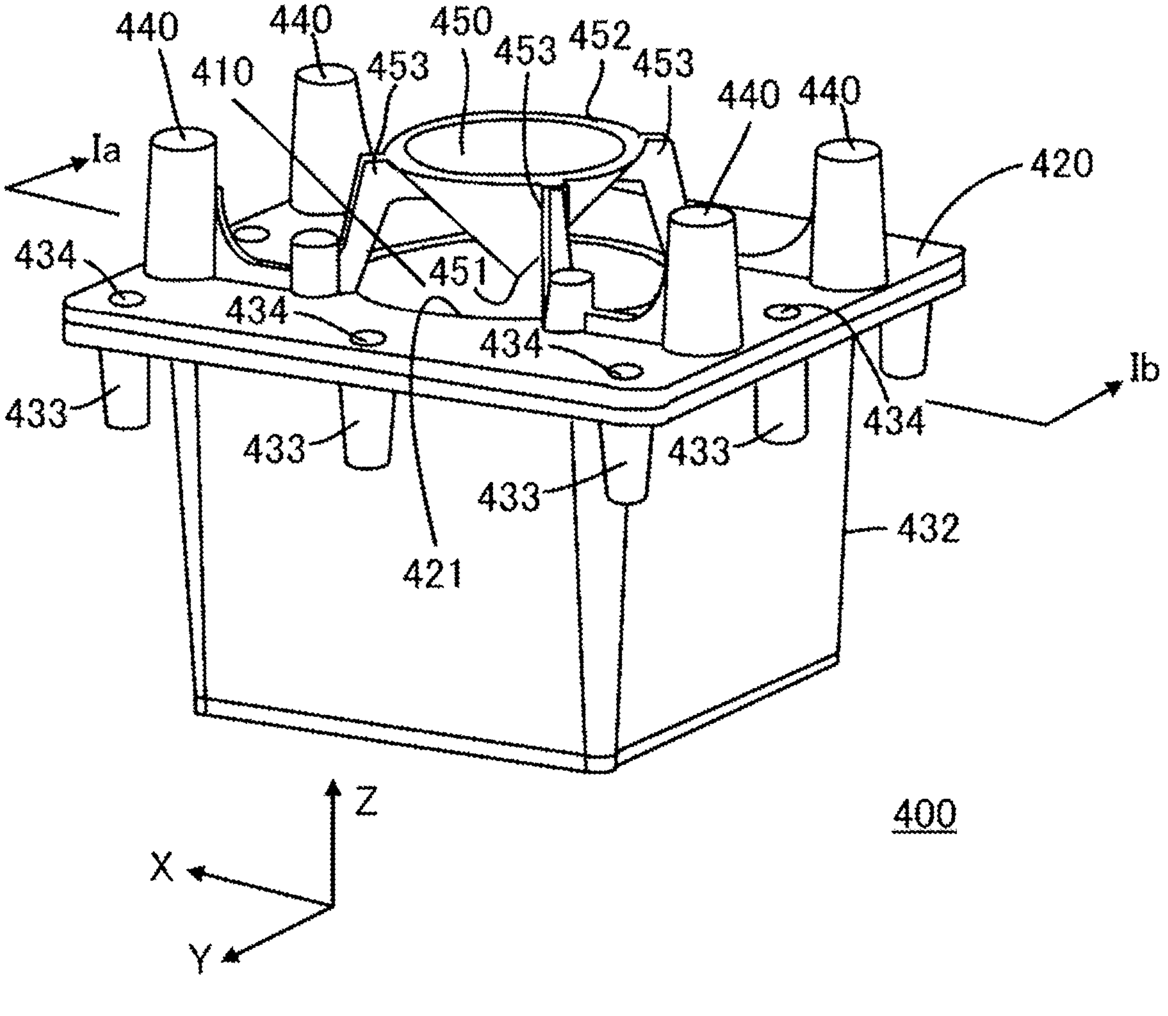
FIG. 2 is a perspective view showing a configuration of a sound emitting unit according to the embodiment.
Figure 3:
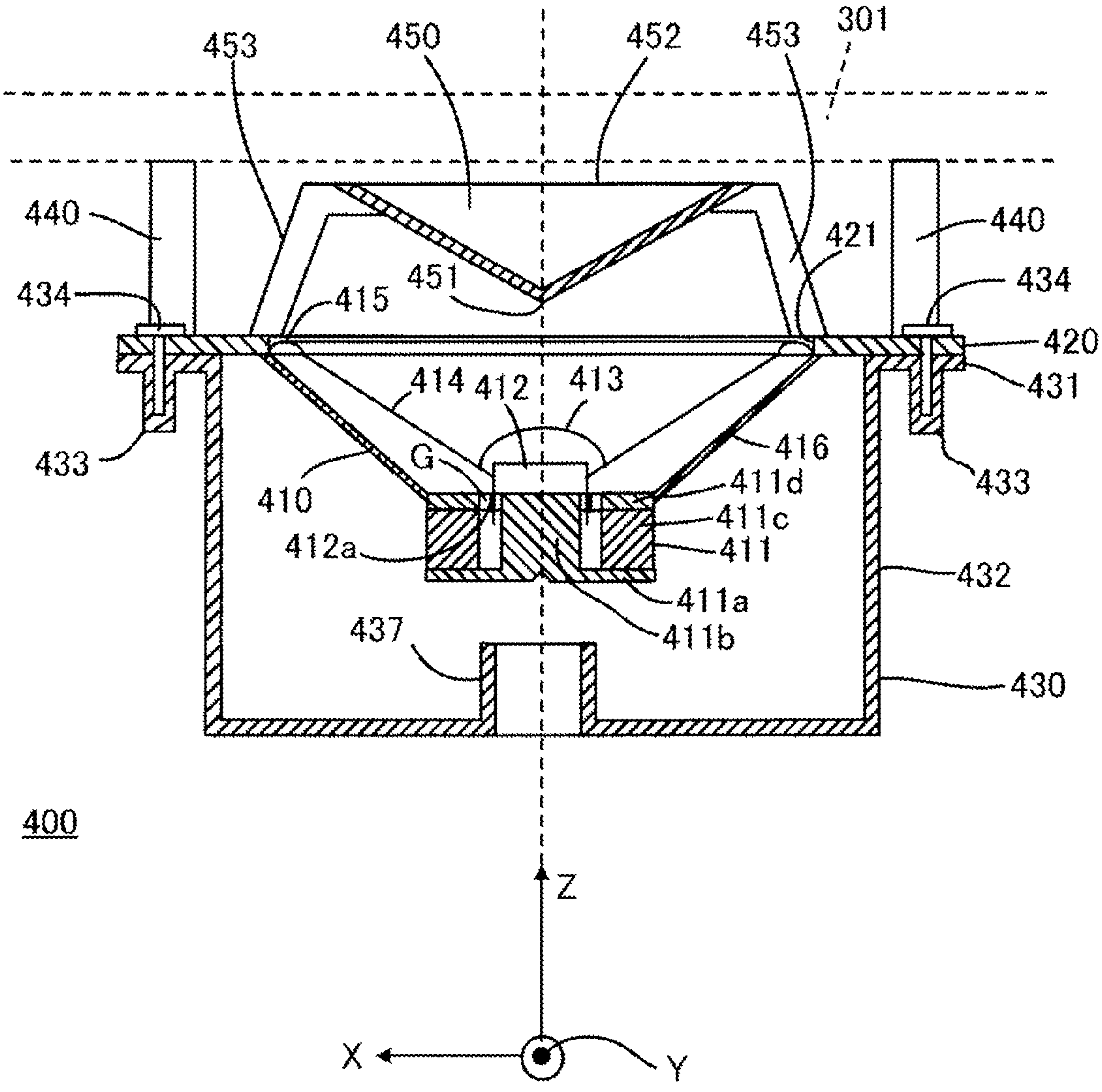
FIG. 3 is a cross-sectional view taken along a line Ia-Ib in FIG. 2.

FIG. 1 is a perspective view showing a configuration of a keyboard electronic musical instrument 300 according to an embodiment of the present disclosure. FIG. 2 is a perspective view showing a configuration of a sound emitting unit 400 according to the present embodiment. FIG. 3 is a cross-sectional view taken along a line Ia-Ib in FIG. 2. Hereinafter, an orthogonal coordinate system including an X axis, a Y axis, and a Z axis that are orthogonal to one another will be assumed, and the configuration of the present embodiment will be described. The Z axis is a vertical axis. A sound emitting axis of a speaker driver 410 in the sound emitting unit 400 is an axis parallel to the Z axis. The X axis is an axis of the keyboard electronic musical instrument 300 in a left-right direction. The Y axis is an axis of the keyboard electronic musical instrument 300 in a front-rear direction. Hereinafter, a left side of the keyboard electronic musical instrument 300 in FIG. 1 may be referred to as a +X side, a right side of the keyboard electronic musical instrument 300 may be referred to as a −X side, a front side of the keyboard electronic musical instrument 300 may be referred to as a +Y side, a rear side of the keyboard electronic musical instrument 300 may be referred to as a −Y side, an upper side of the keyboard electronic musical instrument 300 may be referred to as a +Z side, and a lower side of the keyboard electronic musical instrument 300 may be referred to as a −Z side.

Similarly to a normal keyboard electronic musical instrument, the keyboard electronic musical instrument 300 includes, on a housing thereof, a top plate 301 parallel to an XY plane. The sound emitting unit 400 according to the present embodiment is supported in a manner of being suspended from a back surface of the top plate 301, that is, a surface on the −Z side. In other words, the sound emitting unit 400 is disposed on the back surface of the top plate 301. The position of the top plate 301 in a Z direction substantially coincides with the position of the head of a player of the keyboard electronic musical instrument 300.

The sound emitting unit 400 includes a plate-shaped speaker driver holding portion 420 parallel to the XY plane. The speaker driver holding portion 420 is a member that holds the speaker driver 410. The speaker driver 410 emits sound toward the +Z side, that is, toward the top plate 301.

As shown in FIG. 3, the speaker driver 410 includes a magnetic circuit 411, a voice coil bobbin 412, a dust cap 413, a cone 414, an edge 415, and a support portion 416.

The magnetic circuit 411 includes a circular yoke 411*a* parallel to the XY plane, a columnar pole piece 411*b* protruding from a center region of the yoke 411*a* toward the +Z side, an annular magnet 411*c* surrounding the pole piece 411*b* on the +Z side of the yoke 411*a*, and an annular plate 411*d* surrounding the pole piece 411*b* on the +Z side of the magnet 411*c*. A magnetic field based on the magnet 411*c* is generated in a magnetic gap G between an inner surface of the plate 411*d* and an outer surface of the pole piece 411*b*.

The edge 415 is a substantially annular elastic member. A circular opening 421 having a center on the sound emitting axis of the speaker driver 410 is formed in the speaker driver holding portion 420, and an outer edge of the edge 415 is fixed to an inner edge of this opening 421. The cone 414 is a cone having a large diameter opening on the +Z side and a small diameter opening on the −Z side. The small diameter opening of the cone 414 on the −Z side is connected to an outer peripheral surface of the cylindrical voice coil bobbin 412. A voice coil 412*a* is wound around the voice coil bobbin 412. The voice coil bobbin 412 includes the voice coil 412*a* inserted into the magnetic gap G, and is supported by the cone 414. The dust cap 413 is a dome-shaped member bulging toward the +Z side, and covers the voice coil bobbin 412 from the +Z side. The large diameter opening of the cone 414 on the +Z side is connected to an inner edge of the edge 415, and the outer edge of this edge 415 is connected to the opening 421 of the speaker driver holding portion 420.

The support portion 416 is a cone-shaped member having a small diameter opening on the −Z side and a large diameter opening on the +Z side. The small diameter opening of the support portion 416 on the −Z side is connected to the plate 411*d*, and the large diameter opening on the +Z side is connected to an edge portion surrounding the circular opening 421 of the speaker driver holding portion 420.

An attachment portion 440 is a columnar member protruding toward the +Z side from each of four corners of the speaker driver holding portion 420 having a rectangular shape. End surfaces of the four columnar attachment portions 440 on the +Z side are attached to a back surface of the top plate 301, and the speaker driver holding portion 420 is suspended therefrom. In other words, the attachment portion 440 extends upward from the speaker driver holding portion 420 in a direction along a center axis of the speaker driver 410, and includes an upper surface attachable to the back surface of the top plate 301. Means for attaching the attachment portion 440 to the back surface of the top plate 301 may be an adhesive or the like, or may be a bolt or the like.

A diffuser 450 is a member including a tapered shape, and is supported by the speaker driver holding portion 420 with a distal end portion 451 facing the speaker driver 410. In other words, the diffuser 450 is disposed on the speaker driver holding portion 420 with the distal end portion 451 facing the speaker driver 410. Specifically, the diffuser 450 is a member having a conical shape, and at an opposite side of the distal end portion 451 in the Z-axis direction, a circular base end portion 452 is provided such that a cross-sectional area is widened. The distal end portion 451 of the diffuser 450 is located on the sound emitting axis (specifically, the Z axis passing through the center of the speaker driver 410 in the XY plane) of the speaker driver 410. The base end portion 452 of the diffuser 450 defines a first circle having a center on the sound emitting axis of the speaker driver 410. Four locations on a circumference of the base end portion 452 are connected to the speaker driver holding portion 420 via four legs 453, and are supported by the speaker driver holding portion 420. As described above, the speaker driver holding portion 420 holds the speaker driver 410 in the opening 421 shaped in a circle (for example, a second circle) having a center on the sound emitting axis of the speaker driver 410. Therefore, in the present embodiment, the speaker driver holding portion 420 holds the speaker driver 410 in the opening 421 defining the second circle concentric with the first circle. Then, the diffuser 450 diffuses sound waves emitted from the speaker driver 410 in the Z direction in all directions in the XY plane. Therefore, in the housing of the keyboard electronic musical instrument 300, a horizontal slit that opens toward the player (the +Y side) may be formed at the same height as the back surface of the top plate 301, that is, the surface on the −Z side.

To the speaker driver holding portion 420, a speaker box 430 is attached at an opposite side of the diffuser 450. More specifically, an upper surface portion 431 of the speaker box 430 is attached to a surface of the speaker driver holding portion 420 on the −Z side.

The speaker driver holding portion 420 and the upper surface portion 431 of the speaker box 430 have the same rectangular outline shape as viewed from the +Z side. The speaker box 430 includes a substantially rectangular parallelepiped-shaped storing portion 432 having a rectangular opening on the +Z side that fits inner four sides of the upper surface portion 431. In the center of the bottom of the storing portion 432, a port 437 is formed. The upper surface portion 431 is provided with columnar portions 433 protruding toward the −Z side from four locations at respective four corners and four locations at the respective centers of the four sides. Further, the speaker box 430 is fixed to the speaker driver holding portion 420 by eight bolts 434 that penetrate the speaker driver holding portion 420 and that reach the inside of the eight columnar portions 433. The speaker driver 410 is stored in a space formed by the speaker driver holding portion 420 and the speaker box 430.

In the present embodiment, the height (the position in the Z-axis direction) of a top portion of the attachment portion 440 is substantially the same as the height of the base end portion 452 of the diffuser 450. Preferably, the height of the base end portion 452 of the diffuser 450 does not exceed the height of the top portion of the attachment portion 440, and in this case, the term “substantially the same” as used herein means that the height of the top portion of the attachment portion 440 is exactly the same or slightly smaller than the height of the base end portion 452 of the diffuser 450. A difference between the height of the top portion of the attachment portion 440 and the height of the base end portion 452 of the diffuser 450 may be, for example, in a range of 0.0 mm to 1.5 mm to obtain sufficient uniform amplitude frequency characteristics in the horizontal plane. The difference of 0.5 mm or greater is preferable from the viewpoint of avoiding a chatter noise. Consequently, the difference between the height of the top portion of the attachment portion 440 and the height of the base end portion 452 of the diffuser 450 may be in a range of 0.5 mm to 1.5 mm from the viewpoint of the chatter noise.

According to the present embodiment, when the voice coil 412*a* is energized, the voice coil bobbin 412 and the cone 414 vibrate in the Z-axis direction, and sound waves are emitted in the +Z direction. When the sound waves reach the back surface of the top plate 301, the sound waves are radially diffused and propagate along the back surface of the top plate 301. Therefore, mainly in a low-mid frequency range, uniform amplitude frequency characteristics are attained in a horizontal plane of the head of the player playing the keyboard electronic musical instrument 300. Therefore, it is possible to avoid a change in sound quality when the player moves the head. In the present embodiment, the sound is emitted in all 360° directions including a +X direction, a +Y direction, a −X direction, and a −Y direction. Therefore, the listener can feel spacious sound. According to the present embodiment, since the diffuser 450 diffuses the sound waves, in a high frequency range, uniform amplitude frequency characteristics can also be attained in the horizontal plane.

Although one embodiment of the present disclosure has been described above, there may be other embodiments according to the present disclosure. The following is an example.

(1) The number and installation positions of the sound emitting units 400 may be set freely. One sound emitting unit 400 may be attached to the center of the back surface of the top plate 301, or two sound emitting units 400 may be attached to two locations on left and right sides of the top plate 301.

(2) The sound emitting unit 400 can be easily attached to the keyboard electronic musical instrument 300, and thus may be manufactured and sold independently from the keyboard electronic musical instrument 300.

What is claimed is:

1. An electronic musical instrument comprising:
a sound emitting unit disposed on a back surface of a top plate,
wherein the sound emitting unit comprises:
a speaker driver holding portion configured to hold a speaker driver configured to emit sound toward the top plate;
a diffuser including a tapered shape and disposed on the speaker driver holding portion with a distal end portion of the diffuser facing the speaker driver, the diffuser being configured to guide a sound wave emitted from the speaker driver in a direction along the back surface of the top plate; and
an attachment portion configured to suspend the speaker driver holding portion and attached to the back surface of the top plate.

2. The electronic musical instrument according to claim 1, wherein a height of a top portion of the attachment portion is substantially the same as a height of a base end portion of the diffuser.

3. The electronic musical instrument according to claim 2, wherein the height of the base end portion of the diffuser does not exceed a height of the top portion of the attachment portion.

4. The electronic musical instrument according to claim 1, wherein the diffuser has a conical shape in which a cross-sectional shape of a base end portion is a first circle, and the speaker driver holding portion is configured to hold the speaker driver in a hole defining a second circle concentric with the first circle.

5. The electronic musical instrument according to claim 1, further comprising:
a speaker box provided in the speaker driver holding portion at an opposite side of the diffuser.

6. The electronic musical instrument according to claim 1, wherein the electronic musical instrument is a keyboard electronic musical instrument.

7. A sound emitting unit comprising:
a speaker driver holding portion configured to hold a speaker driver;
a diffuser including a tapered shape and disposed on the speaker driver holding portion with a distal end portion of the diffuser facing the speaker driver, the diffuser being configured to guide a sound wave emitted from the speaker driver in a direction away from a center axis of the speaker driver; and
an attachment portion configured to suspend the speaker driver holding portion and attachable to another member,
wherein the attachment portion extends upward from the speaker driver holding portion.

8. The sound emitting unit according to claim 7, wherein a height of a top portion of the attachment portion is substantially the same as a height of a base end portion of the diffuser.

9. The sound emitting unit according to claim 8, wherein the height of the base end portion of the diffuser does not exceed a height of the top portion of the attachment portion.

10. The sound emitting unit according to claim 7, wherein the diffuser has a conical shape in which a cross-sectional shape of a base end portion is a first circle, and the speaker driver holding portion is configured to hold the speaker driver in a hole defining a second circle concentric with the first circle.

11. The sound emitting unit according to claim 7, further comprising:
a speaker box provided in the speaker driver holding portion at an opposite side of the diffuser.

12. The sound emitting unit according to claim 7, wherein the sound emitting unit is configured to be disposed on a back surface of a top plate of an electronic musical instrument.

13. The sound emitting unit according to claim 7, wherein the attachment portion extends upward in a direction along the center axis of the speaker driver.

14. The sound emitting unit according to claim 7, wherein the attachment portion includes an upper surface attachable to the another member.

* * * * *